Jan. 26, 1960        J. REED        2,922,970

MICROWAVE MATCHING PLUG

Filed Feb. 18, 1955

INVENTOR.
JOHN REED
BY
ATTYS George Sipkin
Lee J. Huntzberger

2,922,970

MICROWAVE MATCHING PLUG

John Reed, Belmont, Mass., assignor, by mesne assignments, to the United States of America as represented by the Secretary of the Navy Application February 18, 1955, Serial No. 489,308

1 Claim. (Cl. 333—98)

This invention relates to microwave matching plugs and more particularly to a microwave matching plug adapted for use in submarine radar equipment to serve as a pressure-tight fluid seal for the submarine hull and in addition to function as an automatic impedance matching means whether coupling into air-filled waveguide or water-filled waveguide on the outside of the hull.

Submarine radar needs a pressure-tight fluid seal for the submarine hull. A dielectric plug best serves this purpose since it is additionally adapted for transmitting microwave energy with minimum loss and without reflection when impedances are properly matched. However, it is necessary that such a plug be effective for proper matching whether there is air or sea water on the load side of the plug. In other words it is necessary that the plug be effective to preclude reflection to incident energy whether the submarine radar is operating when the submarine is completely submerged or if the submarine radar is operating when the submarine is surfaced. Thus the radar can be warmed up under water and the output energy would just be absorbed in the sea water. When the submarine surfaces with the radar going there is a minimum change in standing wave.

The essence of this invention lies in the use of a dielectric plug formed with a transversely cut out portion on the load side. The transversely cut out portion is occupied either by air or sea water depending upon whether the submarine is completely submerged or surfaced. A plug formed with a transverse hole on the load side or formed with a transverse slot on the load side is adapted to perform this function. Both the hole or the slot are merely illustrative since other interruptions in the plug may be resorted to for purposes of matching.

An object of this invention is to provide a microwave matching plug.

A further object is to provide a microwave matching plug for use with submarine radar.

A further object is to provide a microwave matching plug for automatically matching a radar set to a load which may be variously air or sea water.

A further object is to provide a microwave matching plug for providing a pressure-tight fluid seal and for proper impedance matching between a source and a load that is variously air or sea water.

Other objects and many of the attendant advantages of this invention will be readily appreciated as the same becomes better understood by reference to the following detailed description when considered in connection with the accompanying drawings wherein.

Figure 1:
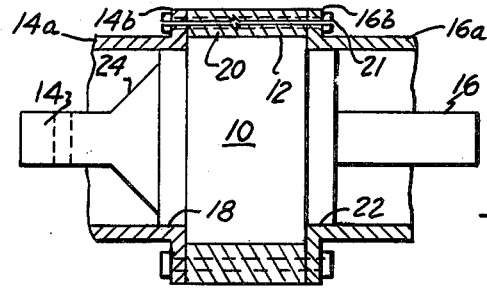
Fig. 1 is a side view of one embodiment of this invention.
Figure 2:
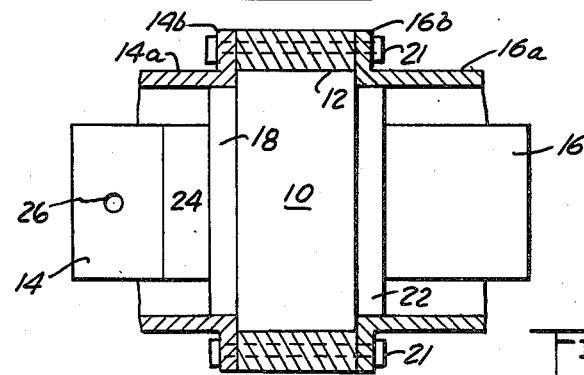
Fig. 2 is a top view of the embodiment of the invention shown in Fig. 1.
Figure 3:
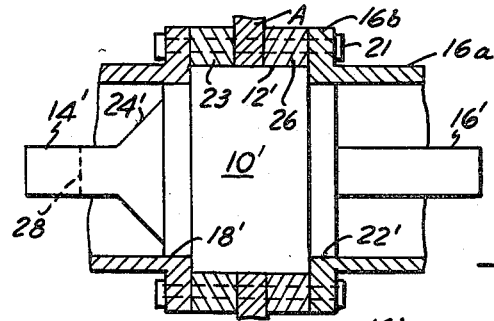
Fig. 3 is a side view of a second embodiment of this invention.
Figure 4:
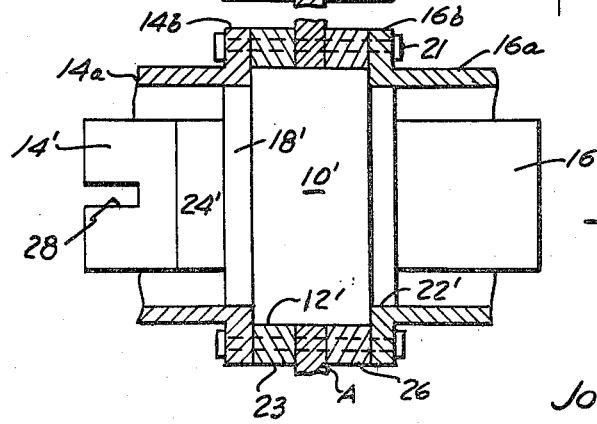
Fig. 4 is a top view of the embodiment of the invention shown in Fig. 3.

The matching plug 10 shown in Figs. 1–2 includes a central portion 12 of enlarged dimensions in transverse section. The central portion 12 has a pressure-tight sealing within an opening formed in the hull A of a submarine. The opening is adapted to form part of the path for microwave energy from a radar equipment within the hull. The plug 10 terminates in a pair of opposed end portions 14 and 16 of corresponding dimensions in transverse section. The opposed end portions 14 and 16 are of equal length. The opposed end portions 14 and 16 are integral with the central portion 12 through step portions 18 and 22, respectively. The end portion 14 is adapted to be located within and connected to a waveguide section 14a leading from an antenna. The end portion 16 is adapted for location within and connection to a waveguide section 16a of corresponding transverse dimension leading from a radar set located within the submarine hull. The end portion 14 is tapered as at 24. If the matching plug 10 matched the impedance looking into the waveguide leading from the radar equipment within the submarine hull to the impedance looking into the waveguide leading from the antenna mounted outside the submarine hull when the latter is operating in air it would not function as a proper match under the conditions where the submarine submerged and the waveguide leading from the antenna were filled with water. To overcome this the plug 10 is formed in the end portion 14 with a transversely cut out portion such as a hole 26. The hole 26 is dimensioned for the operating frequency involved whereby the matching plug serves to match the impedances looking into the ends of the associated waveguides whether the antenna waveguide is filled with air or filled with water. The embodiment of the invention shown in Figs. 3–4 is the same as that shown in Figs. 1–2 except that the former is formed with a slot 28 instead of with a hole 26.

For designing a plug according to this invention, reference is made to volume 9 of Massachusetts Institute of Technology Radiation Laboratory series by Ragan. The basic theory of this invention is discussed on page 225 of Ragan. Ragan also discloses previous plugs and this plug is made to be an outgrowth of those so that it can be clamped in position to withstand high pressure; it is made of one piece for strength reasons. This procedure is to design a matching plug which is matched into air and then to measure the standing wave ratio when sea water is in the antenna waveguide, i.e. the load side of the matching plug. Because of the great change in the dielectric constant from air to water the mismatch may be large. The matching plug should not affect the air match but should match out the reflection when looking into sea water. The tapered portion 24 of the plug on the load side was originally thought to be sufficient to match the plug, both into air and sea water, but it was found after some tests, that the resultant match is not good enough. To provide the necessary match, the plug is formed with a hole or slot which is the essence of this invention. The size and position of the hole or slot are found experimentally for the particular conditions. The hole 26 (Figs. 1 and 2) is formed in the matching plug on the load side. The effect of the hole 26 on the standing wave ratio with air filled waveguide on the load side is so small that it can hardly be measured. However, when the load waveguide is filled with water, this hole acts as a matching post. This hole can be located in such a position that it can match out the residual reflection of the water and plug. To recapitulate, the hole produces practically no reflection when it is filled with air and an amount when it is filled with sea water which is used to match out the rest of the plug. The modification of Figs. 3 and 4 including the slot performs in the same manner. The steps 18 and 22 where the plug is housed in the waveguide are critical in the sense that sealing must be accomplished there. Dimensions of the rest of the plug are not as critical.

The material for making a specimen of the plug preferably consists of 49.75 percent by weight of Vycor 7911 (Corning Glass Works) through 325 mesh, 49.75 percent Stycast T (Emerson and Cuming Co., 162 Mass. Ave., Boston, Mass.), which is a modified polystyrene casting resin, 0.4 percent benzoyl peroxide and 0.1 percent of 6 percent cobalt naphthenate. In fabricating the plug, emery or other material which would leave a deposit is not used. The surface of the plug is given a fine finish. Important properties of the finished plug is that its dielectric constant is to be 2.97±.08 and the loss tangent is not to exceed .0033. Water absorption shall not exceed 0.5% by weight when subjected to 500 p.s.i. water pressure for 24 hours. The dimensions of the plug are based upon the waveguide size and the frequency.

Obviously many modifications and variations of the present invention are possible in the light of the above teachings. It is therefore to be understood that within the scope of the appended claim the invention may be practiced otherwise than as specifically described.

I claim:

In a submarine of the type having radar means within the hull and an antenna without the hull, connected together by wave guide sections, and a dielectric plug secured in and closing an opening in the hull and coupling inside and outside wave guide sections at the hull, that improvement in said plug which comprises a body of dielectric material having peripheral surfaces of relatively large diameter over which adjacent ends of the wave guide sections are telescoped and fitted, and end projections of approximately rectangular shape and partially filling said waveguides in transverse cross section, with the smaller dimensions of the rectangular ends parallel to the directions of the electric field in the projections, first means for impedance matching said waveguide, said means comprising said end projections, second means on the end projection of said plug in the outside wave guide section for matching out the effect of water in the outside waveguide, and for having a negligible effect on the matching of the outside waveguide when filled with air, said second means comprising a channel through the end projection in the direction of said electric field for matching out the effect of water in the outside waveguide, and for having a negligible effect on the matching of the outside waveguide when filled with air, said second means comprising a channel through the end projection in the direction of said electric field.

References Cited in the file of this patent

UNITED STATES PATENTS

| | | |
|---|---|---|
| 2,411,534 | Fox | Nov. 26, 1946 |
| 2,534,289 | Mieher | Dec. 19, 1950 |
| 2,635,145 | Luhrs | Apr. 14, 1953 |
| 2,717,917 | Isenberg | Sept. 13, 1955 |

FOREIGN PATENTS

| | | |
|---|---|---|
| 623,756 | Great Britain | May 23, 1949 |

OTHER REFERENCES

Microwave Transmission Circuits by Ragan, vol. 9, pages 223 and 224.